Figure 1:
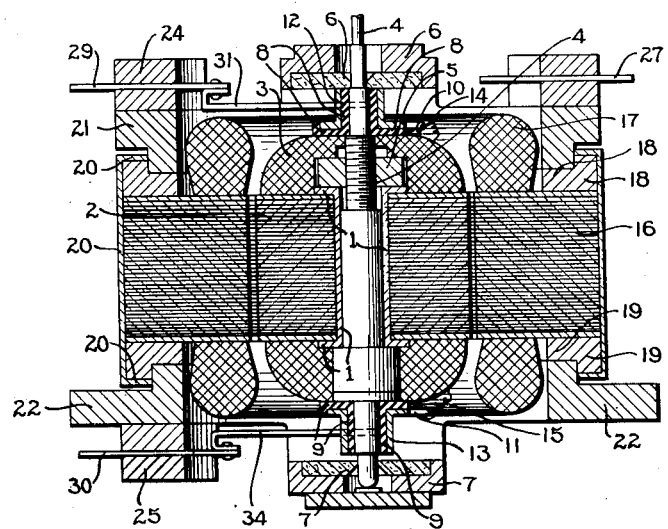

Jan. 27, 1942.　　　W. FIELITZ ET AL　　　2,270,999
TRANSMITTER OR RECEIVER OF THE MOTORLIKE TYPE
Filed April 18, 1940

INVENTORS
Willi Fielitz
BY Anton Schlindwein
Stephen Gerstvik
ATTORNEY

Patented Jan. 27, 1942

2,270,999

UNITED STATES PATENT OFFICE 2,270,999

TRANSMITTER OR RECEIVER OF THE MOTORLIKE TYPE

Willi Fielitz, Blankenfelde, Kreis Teltow, and Anton Schlindwein, Berlin-Siemensstadt, Germany, assignors to Siemens Apparate und Maschinen Gesellschaft mit beschränkter Haftung, Berlin, Germany, a corporation of Germany Application April 18, 1940, Serial No. 330,402
In Germany November 30, 1938

6 Claims. (Cl. 172—36)

This invention relates to a transmitter or receiver of the motor-like type.

The known transmitters or receivers of the motor-like type are particularly employed for the tele-indication or transmission of angle values. Such devices must develop a given minimum torque even in the case of the smallest displacements of the transmitter with respect to the receiver in order that a proper adjustment takes place. To this end, they must, as regards their electrical and mechanical construction be so dimensioned that they meet the desired requirements, in which case, however, the weight, demand of power, driving moment etc. do not play an important part. However, difficulties are presented if transmission systems are involved, arranged particularly on vehicles, for instance, on airplanes, traveling plants or the like, in which a small weight, small demand of power, small driving moment and a high torque are in general, of great importance when using such systems.

The object of the invention is to provide means for transmitters or receivers of the motor-like type by means of which a high power may be obtained with less material and therefore smaller dimensions. One means regards the support of the rotor laminations by beading a sleeve capable of being shifted on the rotor shaft. By supporting the laminations in this manner the rotor laminations need not be perforated at all for screws or rivets so that not only the available iron cross-section may be completely utilized and consequently the diameter thereof may be kept smaller, but also the friction and the input of the system is reduced owing to the reduction of the mass. A further means regards the support of the stator laminations by beading the jacket of the casing. Also in this case the laminations are held together without auxiliary means such as rivets, screws or the like so that the diameter of the stator laminations may be reduced. This measure therefore contributes to reduce the dimensions and also the weight. At the same time rings are held together at both sides of the stator laminations by the beaded casing jacket and serve to secure the traverses carrying the bearings and the current carrying parts. By this measure also any weakening and enlargement of the active stator iron that becomes otherwise necessary are avoided. To reduce the moment of friction to a great extent which may be of great influence as regards the formation of faults, particularly in the case of systems of small dimensions, the rotor shaft is mounted in bearings consisting of artificial resin having fabric intermediate layers. Such a suitable material is, for instance, known in the art under the trade name "linax." To also reduce the moment of friction the slip ring may be subdivided into two parts. In this case a slip ring is arranged between each bearing and the rotor. It is thus possible to dimension both slip rings with the smallest diameter owing to the omission of the bore for the supply conductor to the second slip ring lying otherwise in the interior. The slip rings themselves are glued to the insulating pressings secured to the rotor shaft and are provided with a lug serving for the connection of the rotor winding. The lug is embedded in the insulating pressing in such a manner that it serves at the same time as a security against rotation.

All these measures contribute to a reduction of the amount of material necessary for electrical and mechanical reasons and therefore to a reduction of the dimensions and weights while reducing at the same time the demand of power and the driving moment for the rotor and while maintaining at the same time the properties of the system necessary for a proper functioning. With a transmitter or receiver constructed according to the invention it is, consequently, possible to attain the maximum power with the smallest amount of material.

Figure 2:
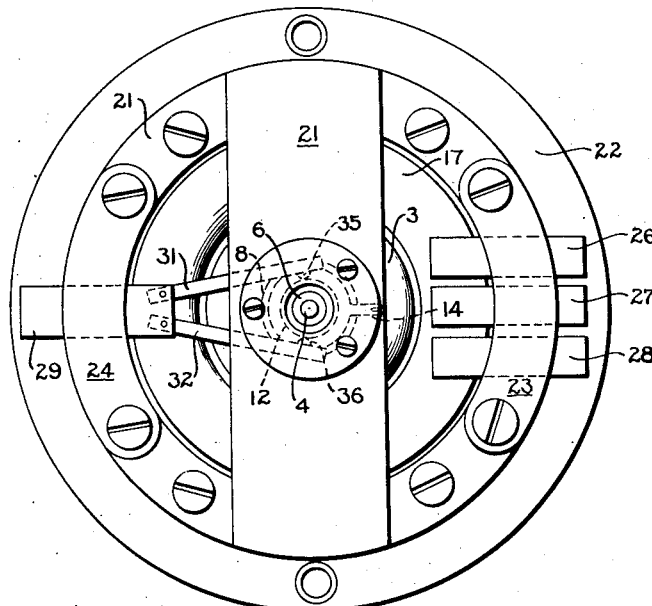

In the accompanying drawing is shown an embodiment of the invention in diagrammatic form, in which Fig. 1 is a cross-sectional view and Fig. 2 a top view of a transmitter or receiver.

Figure 3:
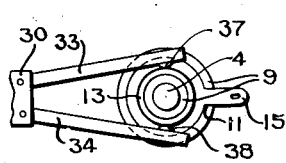

Fig. 3 shows the current supply for the slip rings.

On the sleeve 1 are stacked the rotor laminations 2 and are secured to the same by beading one end of the sleeve 1. The rotor winding is denoted by the numeral 3. The sleeve 1 is capable of being shifted on the rotor shaft 4 and is held firmly in position as shown by a nut 5. The rotor shaft 4 is mounted in bearings 6 and 7. Between the rotor 2 and the bearings 6 and 7 the insulating pressings 8 and 9, each provided with a recess 10 and 11 respectively, are secured to the shaft 4. The slip rings 12 and 13 are glued to the pressings 8 and 9. Each of the rings 12 and 13 is provided with a lug 14 and 15 respectively and is connected to one end of the rotor winding 3 through each lug. The lugs 14 and 15 lie in the recesses 10 and 11 of the pressings 8 and 9 and thus form at the same time a security against rotation for the slip rings 12 and 13.

The stator laminations 16 in which is arranged the winding 17 as well as the rings 18 and 19 are held together by the jacket of the casing 20 beaded at both ends. The upper traverse 21 is secured to the ring 18 and the lower traverse 22 to the ring 19. The two traverses 21 and 22 serve to receive the bearings 6 and 7; furthermore, the insulating pressed parts 23 and 24 are secured to the traverse 21 and the insulating pressed part 25 to the traverse 22. The connections 26, 27 and 28 to which is connected a three-phase stator winding 17 are embedded in the insulating pressed part 23, whereas in the pressed parts 24 and 25 are embedded the connections 29 and 30 for the rotor winding 3. Springs 31, 32 and 33, 34 respectively are secured to the connections 29 and 30 respectively, for instance, by rivets, which springs supply current to the slip rings 12 and 13 by means of the contacts 35, 36 and 37, 38 respectively arranged on the springs.

What is claimed is:

1. A device for transmitting angular movements having a stator core with windings thereon, ring members arranged above and below said core, a casing defining a jacket for supporting said core together with said ring members, annular means secured to each of said ring members, a rotor shaft, non-metallic bearings supported by said annular means at the central axis thereof for rotatably mounting said shaft at each end thereof, a sleeve surrounding said rotor shaft, a rotor core comprising a plurality of laminations concentric with said shaft and supported by said sleeve, a winding for said rotor core, insulating means secured at both ends of said shaft, slip rings mounted on said insulating means and electrically connected with said rotor winding, terminal means insulated from and carried by one of said annular means for providing electrical connection with said stator windings, and spring contact members insulated from and carried by each of said annular means for providing an electrical connection with said slip rings.

2. An electric motor having a stator core comprising a plurality of laminations, windings on said core, ring members arranged above and below said laminations, a jacket for clamping and holding said laminations and said ring members together, annular means secured to each of said ring members, a rotor shaft, non-metallic bearings supported by said annular means at the central axis thereof for rotatably mounting said shaft at each end thereof, an axially shiftable sleeve surrounding said rotor shaft, a rotor core comprising a plurality of laminations concentric with said shaft and held together by said sleeve, a winding for said rotor core, insulating means secured at both ends of said shaft, slip rings surrounding and adhesively secured to said insulating means electrically connected with said rotor windings, terminal means insulated from and carried by one of said annular means for providing electrical connection with said stator windings, and spring contact members insulated from and carried by each of said annular means for providing an electrical connection with said slip rings.

3. An electric motor having a stator core comprising a plurality of laminations, windings on said core, ring members arranged above and below said laminations, a housing jacket for clamping and holding said laminations and said ring members together, annular means secured to each of said ring members, a rotor shaft, resinous bearings supported by said annular means at the central axis thereof for rotatably mounting said shaft at each end thereof, an axially shiftable sleeve surrounding said rotor shaft, means for locking said sleeve in a predetermined position relative to said shaft, a rotor core comprising a plurality of laminations concentric with said shaft and held together by said sleeve, a winding for said rotor core, insulating means secured at both ends of said shaft, slip rings adhesively secured to said insulating means and electrically connected with said rotor winding, terminal means insulated from and carried by one of said annular means for providing electrical connection with said stator windings, and spring contact members insulated from and carried by each of said annular means for providing an electrical connection with said slip rings.

4. An electric motor having a stator core comprising a plurality of laminations, windings on said core, ring members arranged above and below said laminations, a housing jacket for clamping and holding said laminations and said ring members together, annular means secured to each of said ring members, a rotor shaft, resinous bearings supported by said annular means at the central axis thereof for rotatably mounting said shaft at each end thereof, a sleeve surrounding said rotor shaft, a rotor core comprising a plurality of laminations concentric with said shaft and held together by said sleeve, a winding for said rotor core, insulating means secured at both ends of said shaft, slip rings adhesively secured to said insulating means electrically connected with said rotor winding and each of said rings having a portion thereof embedded in said insulating means whereby relative rotation between said rings and said shaft is prevented, terminal means insulated from and carried by one of said annular means for providing electrical connection with said stator windings, and electrical connections for said slip rings insulated from and carried by each of said annular means.

5. In apparatus of the class described, a plurality of rotor laminations provided with a common central perforation therethrough, windings for said laminations, a rotor sleeve mounted in said perforation and having flanges at predetermined positions thereon for clamping together said rotor laminations, a rotor shaft surrounded by and locked to said sleeve, stator means for said rotor comprising a plurality of stator laminations, windings for said stator laminations, a housing jacket having flanges thereon for clamping together said stator laminations, an insulator provided with a recess therein mounted at one extremity of the shaft, a second insulator provided with a recess therein mounted at an opposite extremity of said shaft, a slip ring mounted on said first insulator and having a projection for engaging the recess in the first insulator, a second slip ring mounted on said second insulator having a projection for engaging the recess in the second insulator, and means supported by said stator means for mounting the rotor shaft for rotation therein relative to said stator means.

6. Means comprising a transmitter or receiver motor having a stator comprising a core and windings therefor, a rotor shaft, resinous bearings supported by said stator and provided at each extremity of said shaft for mounting the shaft for rotation therein relative to said stator, a laminated rotor core and a winding therefor, a sleeve concentric with said shaft for supporting said rotor core, insulating sleeves secured to the shaft at each end thereof, slip rings adhesively joined to each of said insulating sleeves and having portions thereof embedded in said sleeves, and electrical connections between said slip rings and said rotor winding.

WILLI FIELITZ.
ANTON SCHLINDWEIN.